DOUBLE-TRACK RECORDING SYSTEM

Filed April 2, 1947

INVENTOR.

JACKSON O. KLEBER.

BY Ward, Crosby & Neal

ATTORNEYS.

Patented Aug. 1, 1950

2,517,440

UNITED STATES PATENT OFFICE 2,517,440

DOUBLE-TRACK RECORDING SYSTEM

Jackson O. Kleber, Long Island City, N. Y.

Application April 2, 1947, Serial No. 738,985

6 Claims. (Cl. 179—100.1)

This invention relates to recordings and to methods for reproducing recordings upon a record combining a grooved track and a track formed in a magnetizable medium.

The length of a grooved wave track, which in the past has been formed in a plastic medium comprising the record, is limited by the dimensions of the tablet or cylinder or device bearing same and by the dimensions of the groove itself. It has been possible in the past to increase the effective length of the track, for example, by reducing the width of the groove and/or by reducing the speed of the record relative to a recording stylus. But these expedients have considerably increased the cost of the record and have been impractical for purposes of mass production of records.

Moreover, with reference to sound, records thereof heretofore suggested have been handicapped by sound distortions in certain frequency bands, for example, because of certain harmonics and also because any two frequencies may produce cross-modulation currents in addition to other common harmonics. The quality of reproduction in the upper part of the frequency range may be impaired by high extraneous frequencies which may be even greater in amplitude than the adjacent impressed frequencies. This usually occurs when one of the frequencies is in a lower part of the frequency band where amplitudes are larger than in the upper portion.

In accordance with one form of the present invention, the quality of the reproduction is appreciably improved by separating the recorded frequencies into at least two bands which are separately recorded. These bands may be separately reproduced and translated into sound by means of one or more loudspeakers.

No sound record or means for reproducing sound upon a record has been suggested in the past for making full use of the area of a record upon which a magnetic track can be formed.

Furthermore, apparatus of this type heretofore suggested has failed efficiently to propel means electrically responsive to the magnetic track whereby a maximum length of magnetic track may be utilized upon a given recording area.

According to the present invention, apparatus is provided for overcoming the above difficulties.

Various further and more specific features and advantages will clearly appear from the detailed description given below taken in connection with accompanying drawings, which form a part of this specification and illustrate, by way of example, the preferred arrangements of apparatus for carrying out the invention. It is to be expressly understood that the drawings are for purposes of illustration only and are not intended as a definition of the limits of the invention, reference for this latter purpose being had to the appended claims.

Figure 1:
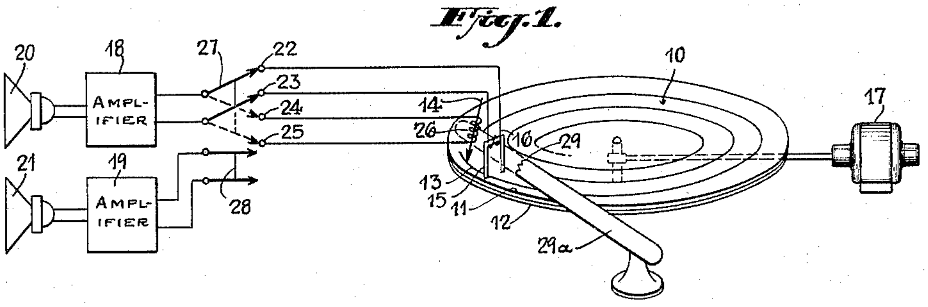
Fig. 1 is a schematic diagram of one form of double track record in combination with a means for translating the variations in said tracks into sound.

Referring to the drawings, the novel apparatus comprises a double track record wherein a magnetic track is associated with a grooved sound track which is formed, for example, in a record of a suitable material, such as shellac or plastic or lacquer. The magnetic track is formed in a magnetizable medium which is secured to the plastic record. For example, finely divided magnetic particles may be suspended in the material comprising the record or said particles may comprise a separate layer which is attached to or is within the plastic record.

Thus the novel record comprises a travelling tablet or cylinder of material having a sound groove formed therein with which the reproducing stylus is associated. The stylus is shaped for engagement with the sound groove and is free to be propelled relative to the record and to be vibrated by the mechanical variations occurring in the sound groove. Said finely divided magnetic particles secured to the record have a magnetic track formed therein preferably along the sound groove, however, the magnetic track need not necessarily follow along said groove. The pick-up for the magnetic track is secured to and guided by the mounting for the stylus. Of course, a linkage for moving the magnetic track pick-up, which linkage is actuatable by the movement of the stylus, is within the purview of this invention. The magnetic track pick-up is responsive electrically to the magnetic track and has means associated therewith for retranslating, for example into sound, the electrical variations produced in the pick-up by variations in magnetization occurring in said magnetic track. An important feature of this invention is the interconnection between the reproducing stylus and the pick-up for the magnetic sound track, whereby the pick-up is propelled by the stylus. The latter, of course, is movable relative to the record by virtue of its engagement with the sound groove.

This invention also includes within its purview a novel method for reproducing sounds from a grooved sound track and a magnetic sound track confined in a single record. The novel method consists in vibrating a stylus by and in the grooved track, propelling the stylus relative to the record by and in accordance with said grooved track and simultaneously propelling a magnet along the magnetic sound track by means of the stylus, and translating into sound the variations in the field of the magnet produced by magnetic variations in the magnetic sound track. However, the magnetic track is not limited to a recording of sound and may have impressed therein frequencies beyond an audible range.

Figures 2, 3:
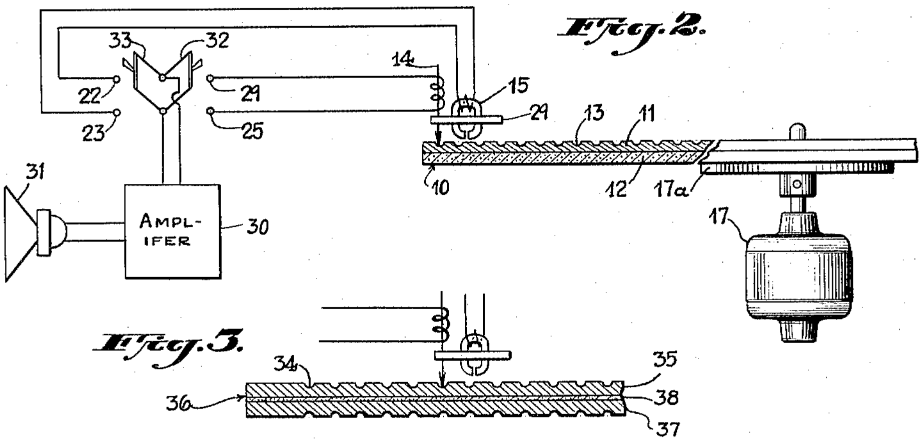
Fig. 2 is a schematic diagram of the same form of double track record shown in Fig. 1 in combination with a slightly different arrangement of means for translating the variations in said tracks into sound.
Fig. 3 is a sectional view with parts broken away of a second form of recording embodying the present invention, there being schematically illustrated therewith parts of a combined pickup.

One preferred form of the novel record is illustrated in Figs. 1 and 2 and comprises a sound recording 10 which is made up of two separate layers 11 and 12. The recording 10 as shown is in the shape of a rotatable tablet or disc. However, it may be in any other suitable shape, such as a cylinder. The layer of material 11 is constituted by a plastic such as vinyl acetate or the like, and has formed therein a suitable sound groove 13, which can comprise a standard phonograph record pressing. The grooved sound track is spiral in conformation and is adapted for vibrating a stylus 14 in a conventional manner by any suitable wave formation therein. The stylus 14 communicates the vibrations to electrical reproducing apparatus which will be described later.

The layer 12 includes a magnetizable medium in which a magnetic track is formed. It consists of a suitable material, such as paper or plastic, which is impregnated, for example, with finely divided magnetic particles of powdered iron, loadstone, or a magnetic nickel alloy. The magnetic track may be impressed upon the magnetizable medium by conventional means and this track preferably is of spiral contour and adjacent the grooved spiral sound track. However, the magnetic track is not to be construed as necessarily adjacent the grooved track.

A pick-up electrically responsive to the magnetic track is provided comprising a suitable magnet 15 having a coil 16 associated therewith. Variations in the magnetization of the magnetic track produce variations in the magnetic field of the magnet 15 and thereby induce a voltage in the coil 16 which is translatable, for example into sound, in a conventional manner. The pick-up for the magnetic track is situated upon a common mounting with the stylus 14 whereby the latter guides the former. Thus the extent of the area having a magnetic track may be equal to that having a grooved track and the length of the magnetic track can be substantially equal to the grooved track.

The rotatable tablet 10 may rest upon a suitable rotating table 17$a$ (Fig. 2) and may be turned by the electric motor 17.

In one form of the present invention, the sound recorded in a magnetic sound track is reproduced simultaneously with that of a grooved sound track and in another form the recordings in said tracks can be reproduced separately.

Means for reproducing said sound either separately or jointly are shown in Fig. 1 comprising a pair of amplifiers 18 and 19 which are respectively connected to conventional loudspeakers 20 and 21. The interconnection between the combined pick-ups for the two tracks is constituted by a switching device whereby the amplifier 18 may be connected to either the stylus 14 or separately to the magnet 15. The pick-up for the magnetic sound track is connected to a pair of contacts 22, 23, and the stylus 14 is operatively connected to a separate pair of contacts 24 and 25 by means of suitable leads which are connected to a coil 26 associated with a stylus 14. A shiftable double-pole switch 27, which is connected to the amplifier 18, is adapted for contacting either the pair of contacts 22, 23 or the pair 24, 25.

If it is desired to reproduce the sound of both sound tracks simultaneously by different loudspeakers, the second amplifier 19 can be connected to the pair of contacts 24, 25 by means of a double-pole switch 28, the other pairs of contacts being, of course, connected to the amplifier 18.

As above mentioned, the stylus 14 and the magnet 15 have a common mount as at 29 whereby the magnetic pick-up is guided and propelled by the stylus which in turn is moved relative to the record by and in accordance with the sound groove.

If it is desired to avoid the distortion of sound described above, for example, when reproducing music, the sounds within a predetermined low frequency band may be recorded in the sound groove, and sounds within predetermined high frequency band may be recorded upon the magnetic track. These sounds may be reproduced simultaneously by means of the above-described amplifiers and loudspeakers.

If it is desired to increase the length of a recording which may be recorded upon a given record, the grooved sound track may be played before or after the magnetic sound track, there being separate recordings upon each sound track. Thus, in the case of a conventional disc type of record, the length of recording on one side thereof is doubled.

The combined pick-up for both sound tracks as shown in Fig. 1 may be mounted upon a conventional arm 29$a$ of the type illustrated and, as above described, the grooved sound track guides the arm by virtue of the engagement of the stylus 14 therewith and substantially the entire area of the record may be used for both a grooved sound track and a magnetic track. Of course, normally the center of this disc does not bear any track.

A single amplifier 30 is employed in Fig. 2 rather than a double amplifier as in Fig. 1. The amplifier 30 is connected to a loudspeaker 31 and is associated with the combined pick-up in a somewhat different manner. The single amplifier 30 may be simultaneously connected both to the magnet 15 and the stylus 14 or separately thereto by means of switches 32 and 33 which respectively interconnect contacts 24, 25 and contacts 22, 23 to the amplifier 30. The switches 32 and 33 may be operated separately.

In the form of the novel record shown in Fig. 3, a grooved track 34 is formed in one lamination 35 of a tablet 36. The grooved sound track can be pressed or cut or embossed as can the grooved track 13 of Figs. 1 and 2. Sandwiched between lamination 35 and lamination 37 is a thin layer 38 comprising the magnetizable medium. This magnetizable medium may be secured to a sheet of paper or plastic and interposed between the laminations 35 and 37.

Figure 4:
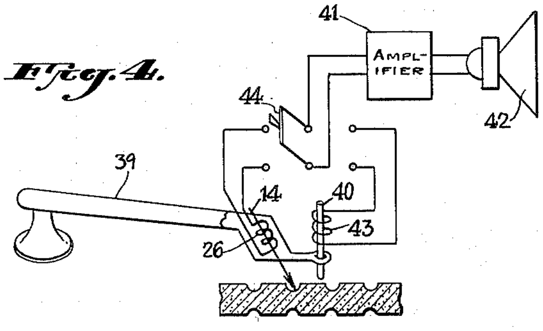
Fig. 4 is a schematic illustration of another form of recording embodying the present invention in combination with means responsive to the variations in said tracks.

Another embodiment of the novel record is illustrated in Fig. 4 wherein the magnetizable medium also consists in finely divided particles, for example, of iron, which particles are mixed in with the plastic comprising the record tablet. A magnetic track, of course, is formed in the particles thus situated.

In the embodiment of Fig. 4, the combined pick-up is secured to an arm 39 which is mounted for free pivotal movement about a vertical axis as viewed in this figure and also about a horizontal axis in a well known manner. In the previous figures, the pick-up for the magnetic track has included a horseshoe type magnet. However, a bar magnet 40 may be employed as shown in Fig. 4. Magnet 40 is secured to the arm 39 in conjunction with the stylus 14 and is connected by suitable means to an amplifier 41 having a loudspeaker 42. A coil 43 is employed with the magnet 40, which is analogous to the coil 16 of magnet 15. These coils are individually connectable to the amplifier 41 by means of a switch 44. Of course, if desired, a single or double amplifier and switching structure, as shown in Figs. 1 and 2, may be employed.

In addition to reproducing two different recordings, one in the grooved sound track and one in the magnetic sound track, and in addition to recording different frequency bands in the two types of sound tracks, it is possible to achieve binaural effects by recording in one sound track sound that is picked up from one recording apparatus and recording in the other sound track the same sound as picked up by a different recording device. Separate amplifiers may be employed for each sound track.

An important feature of the above-described invention comprises the structure wherein the sound groove acts as a guide not only for propelling the stylus relative to the record but also as a guide for moving the magnetic track pick-up in accurate registration with the magnetic track. This structure is of appreciable importance with respect to spirally recorded magnetic tracks which, of course, have no ability to move a pick-up in registration therewith.

With respect to the sound grooves described above, it is to be understood that this groove may be of the conventional type having elevations and depressions corresponding to the sound waves which produced them. The inequalities or sinuosities of the groove may be upon the bottom thereof or may be laterally inscribed. The stylus 14 may be attached mechanically to a diaphragm instead of to electrical reproducing means and, of course, is kept in engagement with the record and accommodated to the shifting positions of its operative portions.

The functions of the sound groove are: (*a*) Vibration of the stylus, which vibrations are translatable into sound. (*b*) The automatic propulsion of the stylus in the groove across the surface of the record without a feed screw or other independent mechanism, this automatic propulsion being effective simultaneously to move the magnetic track pick-up in register with the magnetic track.

Figure 5:
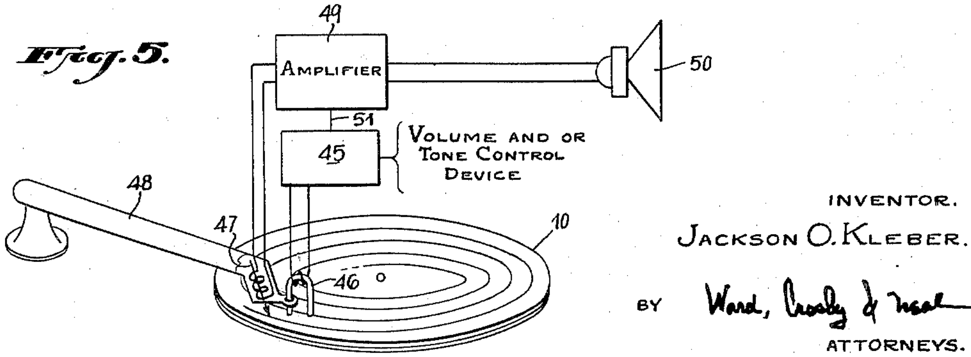
Fig. 5 is a schematic illustration of a double track record in combination with means for translating into sound the recording in a sound track and means for controlling in response to the other track the tone and/or volume of the sound so translated.

It was disclosed above that the frequencies of the magnetic track are not limited to audible frequencies. An example of a combination carrying out the present invention and employing frequencies of this character is shown in Fig. 5. The double track record 10 is here employed having frequencies impressed or formed in the magnetic track which are adapted for actuating a volume control device 45 through the intermediary of a magnetic track pickup 46 analogous to that above described. A grooved track pick-up 47 is secured to a pivoted arm 48 which is a common mounting for both pick-ups 46 and 47. The pick-up 47 is connected in a conventional manner to amplifier 49 and loudspeaker 50. The volume control device, for example, can comprise means for governing the adjustment of the volume control element of the amplifier 49. For example, the angular position of a pivotally mounted solenoid core (not shown) can be communicated by a shaft 51 to the volume control element of the amplifier 49. A suitable voltage amplifier can be employed for insuring positive control of said core.

While the invention has been described with respect to certain preferred examples which have given satisfactory results, it will be understood by those skilled in the art after understanding the invention that various changes and modifications may be made without departing from the spirit and scope of the invention. For example, variations in the grooved track can produce frequencies beyond the audible range, and the tracks need not be spiral. It is intended, therefore in the appended claims to cover all such changes and modifications.

What is claimed is:

1. In apparatus of the class described, a travelling tablet having a groove with a wave recording formed therein, a reproducing stylus shaped for engagement with the groove, means for mounting the stylus for propulsion relative to the tablet and for vibration by the wave recording in the groove, a magnetizable medium secured to the tablet having a magnetic track formed therein, a pick-up electrically responsive to the magnetic track, and mechanism for interconnecting said stylus and pick-up for guiding the pick-up in register with the magnetic track.

2. In a device of the class described, a traveling tablet having a record formed therein comprising a sound groove, a reproducing stylus shaped for engagement with the record and free to be vibrated and propelled by it, a magnetizable medium secured to said tablet having a magnetic track formed therein, and a reproducing device for said magnetic track comprising a pick-up electrically responsive thereto, said pick-up being secured to a mounting for said stylus and adapted for movement therewith whereby said pick-up is moved over the magnetic track.

3. In a device of the class described, a travelling tablet having a wave record groove formed therein, a reproducing stylus shaped for engagement with the groove, said stylus being free to be propelled relative to the tablet and vibrated by the wave record groove, a magnetizable medium secured to the tablet having a magnetic track formed therein, a pick-up electrically responsive to the magnetic track, means for amplifying the electrical variations produced in said pick-up by variations in magnetization in said magnetic track, and an interconnection between the stylus and pick-up whereby the pick-up is propelled by the stylus.

4. In a device of the class described, a travelling tablet having a sound groove formed therein, reproducing means including a stylus, the latter being shaped for engagement with the groove and free to be propelled by it, a magnetizable medium secured to said tablet in which a magnetic track is formed, a pick-up electrically responsive to said magnetic track, and a common mounting for said stylus and pick-up whereby the latter is propelled by the stylus.

5. In apparatus for use with a travelling tablet having a groove with a wave recording formed therein, and also having a magnetic record track, the combination comprising, a reproducing stylus shaped for engagement with the groove, means for mounting the stylus for propulsion relative to the tablet and for vibration by the wave recording in the groove, a pickup electrically responsive to the magnetic track, and mechanism for interconnecting said stylus and pickup for guiding the pickup in register with the magnetic track.

6. For use with a double track record playing device including a stylus and a magnetic pickup with means for moving said pickup in synchronism with said stylus, a double track record comprising, a hardened plastic having a wave record groove formed therein, and a magnetizable substance, the latter being secured to said plastic and having a preselected magnetic track formed therein in predetermined position relative to said wave record groove whereby a stylus moving in said groove and having a magnetic pickup movable therewith will guide the latter accurately along said magnetic track.

JACKSON O. KLEBER.

REFERENCES CITED

The following references are of record in the file of this patent:

UNITED STATES PATENTS

| Number | Name | Date |
|---|---|---|
| 831,779 | Emerson | Sept. 25, 1906 |
| 1,776,097 | Baird | Sept. 16, 1930 |
| 1,787,919 | Watson | Jan. 6, 1931 |
| 1,855,149 | Jones | Apr. 19, 1932 |
| 1,940,274 | Severy | Dec. 19, 1933 |
| 2,361,752 | Eilenberger | Oct. 31, 1944 |